(12) United States Patent
van den Brink et al.

(10) Patent No.: US 12,122,298 B2
(45) Date of Patent: Oct. 22, 2024

(54) CAMERA MIRROR SYSTEM WITH IR LED NIGHT VISION SYSTEM

(71) Applicant: Orlaco Products B.V., Barneveld (NL)

(72) Inventors: Alfred van den Brink, Barneveld (NL); Kent Palsson, Sollentuna (SE)

(73) Assignee: ORLACO PRODUCTS B.V., Barneveld (NL)

( * ) Notice: Subject to any disclaimer, the term of this patent is extended or adjusted under 35 U.S.C. 154(b) by 548 days.

(21) Appl. No.: 17/312,498

(22) PCT Filed: Nov. 28, 2019

(86) PCT No.: PCT/EP2019/082922
§ 371 (c)(1),
(2) Date: Jun. 10, 2021

(87) PCT Pub. No.: WO2020/126396
PCT Pub. Date: Jun. 25, 2020

(65) Prior Publication Data
US 2022/0055540 A1    Feb. 24, 2022

Related U.S. Application Data

(60) Provisional application No. 62/780,460, filed on Dec. 17, 2018.

(51) Int. Cl.
*B60R 1/12* (2006.01)
*H04N 23/72* (2023.01)
(52) U.S. Cl.
CPC ............... *B60R 1/12* (2013.01); *H04N 23/72* (2023.01); *B60R 2001/1253* (2013.01)
(58) Field of Classification Search
CPC .. B60R 1/12; B60R 2001/1253; H04N 23/72; G02B 23/12; G02B 26/007
See application file for complete search history.

(56) References Cited

U.S. PATENT DOCUMENTS 9,227,568 B1 *  1/2016  Hubbell ................... G02B 5/09
2002/0167589 A1  11/2002  Schofield et al.
(Continued)

FOREIGN PATENT DOCUMENTS

| CN | 101135570 A | 3/2008 |
| CN | 102529812 A | 7/2012 |

(Continued)

OTHER PUBLICATIONS

International Preliminary Report on Patentability for International Application No. PCT/EP2019/082922 mailed Jul. 1, 2021.

(Continued)

*Primary Examiner* — Oschta I Montoya
(74) *Attorney, Agent, or Firm* — Carlson, Gaskey & Olds, P.C.

(57) ABSTRACT

A camera mirror system for a vehicle includes a camera having a field of view. The camera has a lens that is configured to focus light on an image capture unit and a filter switch that are each arranged in an optical path provided between the lens and the image capture unit. The filter switch has an infrared (IR) filter that is movable into and out of the optical path in response to a IR filter command A display is in communication with the camera and is configured to display the field of view. An IR light-emitting diode (LED) is configured to illuminate the field of view in response to an IR LED command. A controller is in communication with the image capture unit, the filter switch and the IR LED. The controller is configured to provide the IR filter command and the IR LED command in response to a limited-use night vision condition based upon a factor other than an amount of atmospheric light.

18 Claims, 3 Drawing Sheets

(56) References Cited

U.S. PATENT DOCUMENTS

| | | | |
|---|---|---|---|
| 2004/0017282 A1 | 1/2004 | Eguchi et al. | |
| 2005/0041435 A1 | 2/2005 | Moisel | |
| 2006/0125919 A1 | 6/2006 | Camilleri et al. | |
| 2006/0197019 A1 | 9/2006 | Satou | |
| 2008/0068520 A1 | 3/2008 | Minikey, Jr. et al. | |
| 2009/0072996 A1 | 3/2009 | Schoepp | |
| 2011/0193967 A1* | 8/2011 | Matsumoto | H04N 23/667 |
| | | | 348/E5.09 |
| 2015/0145007 A1* | 5/2015 | Chieh | H01L 27/1464 |
| | | | 257/292 |

FOREIGN PATENT DOCUMENTS

| | | |
|---|---|---|
| JP | 2002308012 A | 10/2002 |
| JP | 2004123043 A | 4/2004 |
| JP | 2005500537 A | 1/2005 |
| JP | 2006182041 A | 7/2006 |
| JP | 2007015660 A | 1/2007 |
| JP | 2007171154 A | 7/2007 |
| JP | 2009219042 A | 9/2009 |
| JP | 2009286227 A | 12/2009 |
| JP | 2010125893 A | 6/2010 |
| KR | 20050026128 A | 3/2005 |
| WO | 2016007799 A1 | 1/2016 |
| WO | 2016018022 A1 | 2/2016 |

OTHER PUBLICATIONS

Chinese Office Action for Chinese Application No. 201980083210.2 mailed Aug. 26, 2022.
International Search Report and Written Opinion for International Application No. PCT/EP2019/082922 mailed Mar. 24, 2020.

* cited by examiner

CAMERA MIRROR SYSTEM WITH IR LED NIGHT VISION SYSTEM

CROSS-REFERENCE TO RELATED APPLICATIONS

This application claims priority to U.S. Provisional Application No. 62/780,460, which was filed on Dec. 17, 2018, and is incorporated herein by reference.

BACKGROUND

This disclosure relates to a camera mirror system having night vision.

Some types of cameras, such as an RGB camera, will not display a visible image from a low-light or no-light environment. One approach to providing a visible image at night is to illuminate the camera's field of view with infrared light-emitting diodes (IR LED).

IR LED systems generate heat as they consume power. If the heat is not sufficiently dissipated, an overheating condition may occur, which can cause damage to the circuitry or generate malfunctions in the system. Solutions have been proposed which cycle the IR LEDs on and off. This may be undesirable for rear facing camera mirror systems of the type employed on commercial trucks.

SUMMARY OF THE INVENTION

In one exemplary embodiment, a camera mirror system for a vehicle includes a camera having a field of view. The camera has a lens that is configured to focus light on an image capture unit and a filter switch that are each arranged in an optical path provided between the lens and the image capture unit. The filter switch has an infrared (IR) filter that is movable into and out of the optical path in response to a IR filter command. A display is in communication with the camera and is configured to display the field of view. An IR light-emitting diode (LED) is configured to illuminate the field of view in response to an IR LED command. A controller is in communication with the image capture unit, the filter switch and the IR LED. The controller is configured to provide the IR filter command and the IR LED command in response to a limited-use night vision condition based upon a factor other than an amount of atmospheric light.

In a further embodiment of any of the above, the field of view corresponds to a rear-facing field view. The IR LED is configured to illuminate alongside a vehicle trailer.

In a further embodiment of any of the above, the display is configured to display Class II and Class IV views.

In a further embodiment of any of the above, the factor is a predetermined speed threshold.

In a further embodiment of any of the above, the factor is a gear position.

In a further embodiment of any of the above, the factor is a transitory lighting condition.

In a further embodiment of any of the above, the transitory light condition is a low light condition on one side of the vehicle compared to an opposite side of the vehicle.

In a further embodiment of any of the above, the image capture unit includes an RCCB filter. A green light is determined by subtracting a red light and a blue light from a clear filter portion.

In a further embodiment of any of the above, the controller provides the IR LED command and the IR filter command simultaneously.

In a further embodiment of any of the above, the controller turns off the IR LED and removes the IR filter from the optical path simultaneously after a predetermined time.

In another exemplary embodiment, a method of managing night vision for a vehicle camera mirror system includes the step of filtering light from a field of view of a camera lens to an image capture unit. The method also includes the step of detecting a limited-use night vision condition based upon a factor other than an amount of atmospheric light. The method further includes the step of powering an infrared light-emitting diode (IR LED) to shine IR light in the field of view in response to the detecting step. The method further includes the step of actuating an IR filter to filter IR light from the lens to the image capture unit in response to the detecting step. The method further includes the step of displaying a night vision image from the image capture unit.

In a further embodiment of any of the above, the powering step includes illuminating alongside a vehicle trailer.

In a further embodiment of any of the above, the displaying step includes displaying Class II and Class IV views illuminated by the IR LED.

In a further embodiment of any of the above, the factor is a predetermined speed threshold.

In a further embodiment of any of the above, the factor is a gear position.

In a further embodiment of any of the above, the factor is a transitory lighting condition.

In a further embodiment of any of the above, the transitory light condition is a low light condition on one side of the vehicle compared to an opposite side of the vehicle.

In a further embodiment of any of the above, the filtering step includes using an RCCB filter that is arranged in a Bayer filter pattern. A green light is determined by subtracting a red light and a blue light from a clear filter portion.

In a further embodiment of any of the above, the powering and actuating steps are performed simultaneously.

In a further embodiment of any of the above, the method includes a step of removing the IR filter from an optical path of the image capture unit simultaneously with powering off the IR LED after a predetermined time.

BRIEF DESCRIPTION OF THE DRAWINGS

The disclosure can be further understood by reference to the following detailed description when considered in connection with the accompanying drawings wherein.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

DETAILED DESCRIPTION

Figure 1:
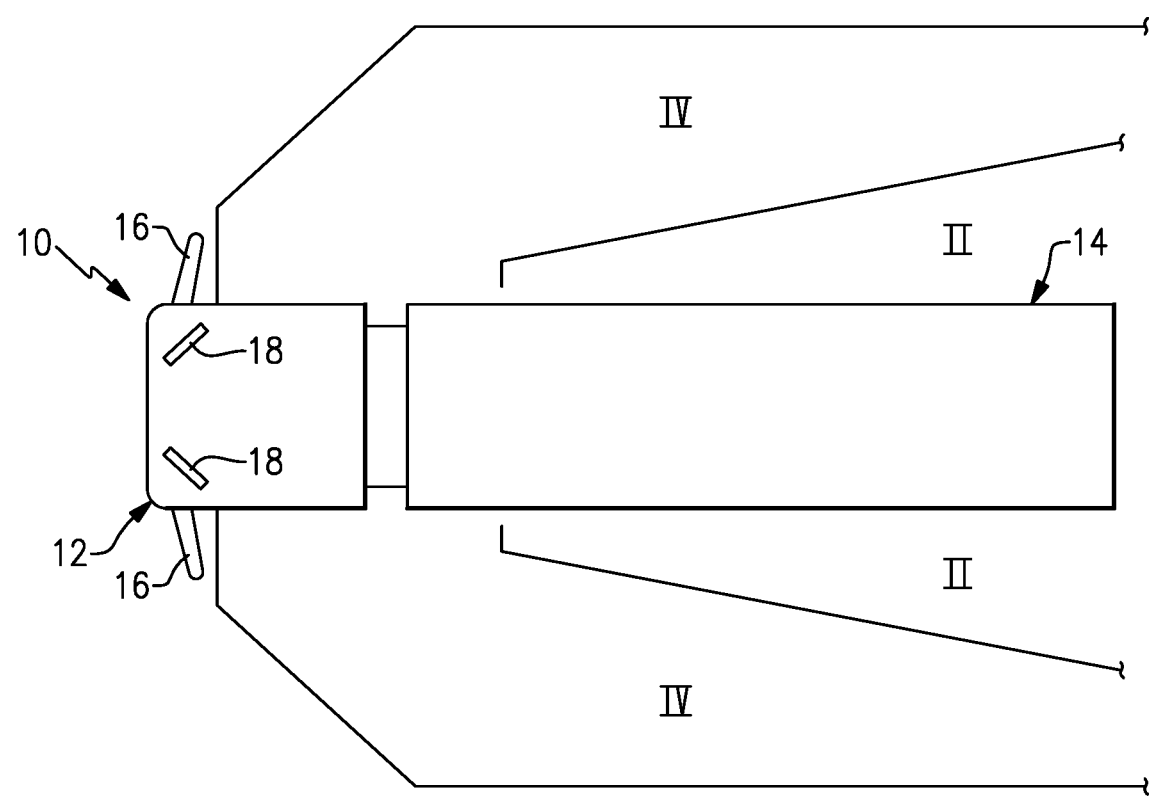
FIG. 1 is a schematic top elevational view of a commercial truck with a camera mirror system providing Class II and Class IV views.

A schematic view of a commercial vehicle 10 is illustrated in FIG. 1. The vehicle 10 includes a vehicle cab 12 for pulling a trailer 14. Driver and passenger side camera arms 16 are mounted to the vehicle cab 12. If desired, the camera arms 16 may include conventional mirrors integrated with them as well. First and second displays 18 are arranged on each of the driver and passenger sides within the vehicle cab 12 to display Class II and Class IV views on each side of the vehicle 10.

A rearward facing camera 22 is arranged within a camera housing 20 of the camera arm. The camera 22 provides a field of view 23 (FIG. 2) that includes at least one of the Class II and Class IV views. Multiple cameras also may be used if desired.

Figure 2:
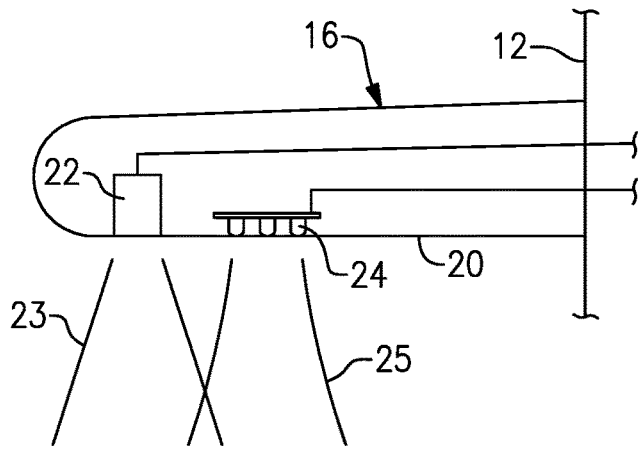
FIG. 2 is a schematic view of an example camera housing having a camera and an IR LED.

Some regulations governing mirror replacement systems require that certain objects be displayed to the driver in color. Some examples include stop signs and emergency lights. To this end, it is desirable to provide a night vision system that both illuminates the field of view 23 but is also able to provide a display to the driver in the necessary colors. Referring to FIG. 2, at least one infrared light-emitting diode (IR LED), which may be provided as a light array, illuminates a field of view 25 which overlaps the field of view 23.

The disclosed camera system employs night vision by activating the IR LED in low light conditions. In one example, an RGB filter is used in the camera 22. The RBG filter provides low light sensitivity such that it may be desirable to activate the night vision at 6 lux, for example, to provide the desired visibility to the driver. It may be desirable to increase the low light sensitivity of the camera to reduce the need for night vision. One such example camera 22 is shown in FIG. 3.

Figure 3:
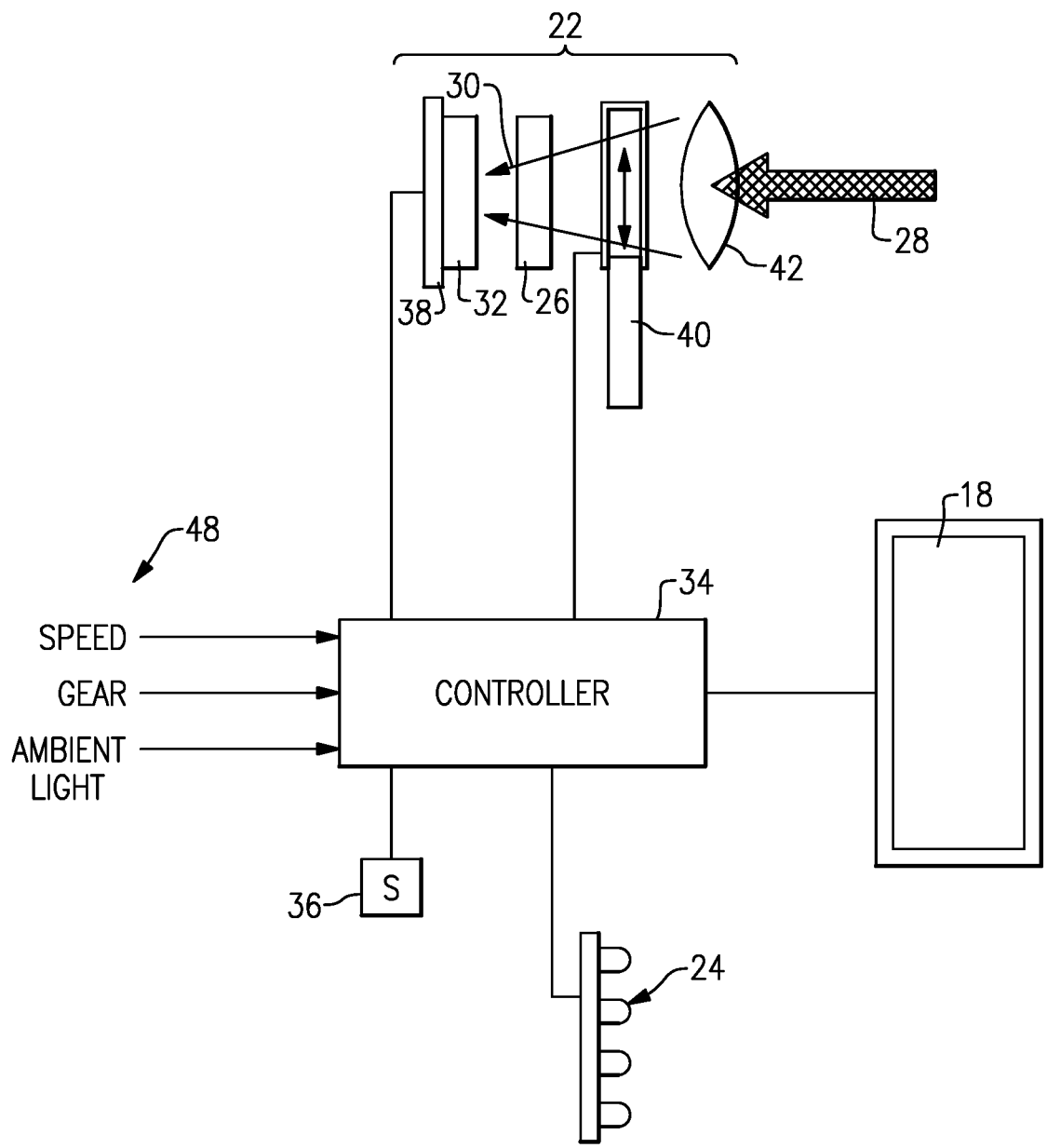
FIG. 3 is a schematic view of a camera mirror system with night vision.

With continuing reference to FIG. 3, the camera 22 includes a PCB 38 supporting an image capture unit 32. A lens 42 focuses light 28 from the field of view 23 along an optical path and onto the image capture unit 32. In the example, an RCCB filter 26 increases low light sensitivity such that night vision may be activated at, for example, 4 lux to provide the same desired visibility to the driver that is only obtainable down to 6 lux. A filter switch 40 may be arranged in the optical path provided between the lens and the image capture unit 32. It is not possible to integrate the RCCB filter into the filter switch. Although the RCCB filter 26 is shown in the schematic as a separate, the RCCB filter is part of the CFA (Color Filter Array) of the image capture unit 32. The filter switch 40 typically has an IR filter (day) and no filter (also, for example, an anti-reflective (AR) coating for night vision). The filter switch 40 filters out IR to provide improved, crisper daytime visibility, while another portion of the filter switch 40 has no IR filter that permits IR (from IR LED and scene) to pass through to the image capture unit 32 to provided improved nighttime visibility.

Use of the IR LED for night vision purpose is limited as the diodes within the image capture unit 32 may become saturated from the IR light. The filter switch 40 may be of the type disclosed in United States Publication No. 2018/0180833, for example, which is incorporated herein by reference in its entirety.

A controller 34 communicates with the display 18, the IR LED 24, the image capture unit 32 and the filter switch 40. A controller 34 is configured to activate night vision in response to a manual input from a switch 36, or automatically when certain conditions are present. In one example, the filter switch 40 is activated simultaneously with the IR LEDs 24 powering on. This places the IR filter of the filter switch 40 between the lens 42 and the image capture unit 32.

Figure 4:
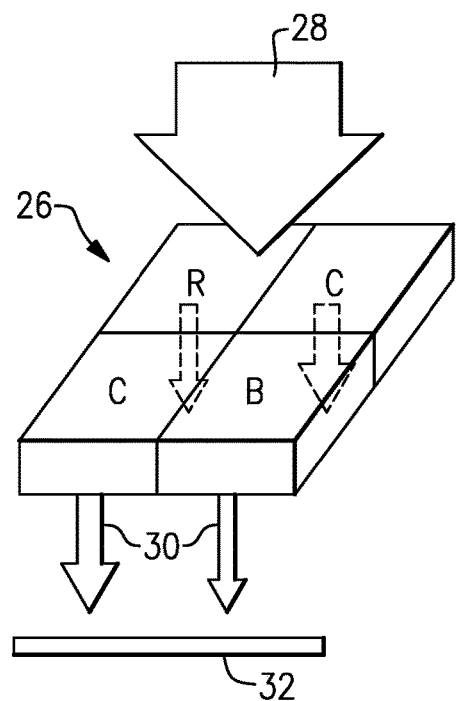
FIG. 4 is a schematic view of a filter for a camera used in the disclosed camera mirror system.

A schematic illustration of the RCCB filter 26 is illustrated in FIG. 4. Light 28 from the field of view 23 (FIG. 2) passes through the RCCB filter 26 along the optical path and provides filtered light 30 onto the image capture unit 32. In the example, the RCCB filter 26 is configured in a 2×2 Bayer filter pattern. The "R" portion of the RCCB filter 26 filters the light 28 to permit red to pass through and onto the image capture unit 32, and the "B" portion of the RCCB filter 26 filters the light 28 to permit blue light to pass through and onto the image capture unit 32. The "C" portions (i.e., Clear) permit the light 28, including red, green and blue (and IR), to pass through onto the image capture unit 32. The green portion of the light 28 needed for the display 18 is determined mathematically by subtracting the red and blue light from the "R" and "B" portions from the "C" portion of the RCCB filter 26. Interpolation and noise reduction algorithms are applied, which results in improved low light sensitivity. Known techniques are available from various manufacturers of filters and image capture units.

In addition to the improved low light sensitivity provided as described above, which reduces the need for night vision, limited-use night vision conditions may also be used to reduce the need for the IR LED 24. Various inputs 48 from the CAN bus, for example, relating to these conditions may be provided to the controller 34. In one example, the inputs 48 relate to speed, gear position, and/or ambient light. Other inputs may also be provided.

In one example, night vision is activated when the vehicle speed is below a predetermined speed threshold, for example, 5 mph, providing improved visibility to the driver during low speed maneuvers. In another example, when a reverse gear is detected, night vision may be activated to provide improved visibility surrounding the trailer when backing up. Ambient light condition may also be detected to activate the night vision during certain transitory lighting conditions, such as when the vehicle is in a shadow on one side but where a typical ambient light sensor located at the front of the vehicle near the instrument cluster would not detect a low light condition that would activate the night vision system. In this manner, the limited-use night vision conditions employ night vision based upon a factor other than an amount of atmospheric light, for example, based upon daylight conditions only.

Figure 5:
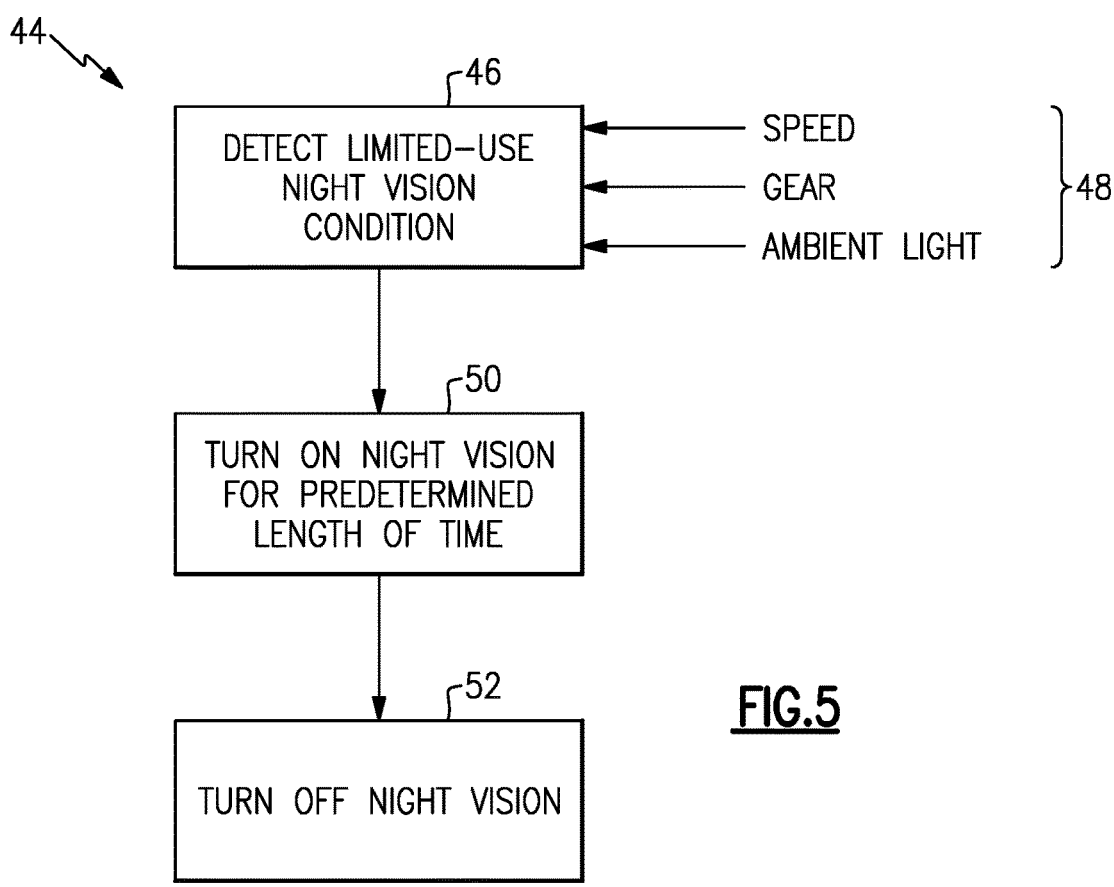
FIG. 5 is a flow chart depicting a method of managing night vision for a vehicle camera mirror system.

In operation, referring to FIG. 5, a method 44 of managing night vision for the vehicle camera system is disclosed. The method 44 includes detecting limited-use night vision conditions, as indicated at block 46, such as speed, gear, and ambient light and/or other inputs 48. The night vision is turned on for a predetermined length of time, as indicated at block 50. That is, the night vision is not turned on and left on based solely upon the atmospheric lighting condition. For example, once the speed is above a predetermined threshold, such as 5 mph, or the gear selector is placed in a forward gear from a reverse gear, the night vision is turned off, as indicated at block 52.

It should also be understood that although a particular component arrangement is disclosed in the illustrated embodiment, other arrangements will benefit herefrom. Although particular step sequences are shown, described, and claimed, it should be understood that steps may be performed in any order, separated or combined unless otherwise indicated and will still benefit from the present invention.

Although the different examples have specific components shown in the illustrations, embodiments of this invention are not limited to those particular combinations. It is possible to use some of the components or features from one of the examples in combination with features or components from another one of the examples.

Although an example embodiment has been disclosed, a worker of ordinary skill in this art would recognize that certain modifications would come within the scope of the claims. For that reason, the following claims should be studied to determine their true scope and content.

What is claimed is:

1. A camera mirror system for a vehicle comprising:
   a camera having a field of view, the camera including a lens configured to focus light on an image capture unit and a filter switch each arranged in an optical path provided between the lens and the image capture unit, the filter switch having an infrared (IR) filter movable into and out of the optical path in response to a IR filter command;
   a display in communication with the camera and configured to display the field of view;
   an IR light-emitting diode (LED) configured to illuminate the field of view in response to an IR LED command; and
   a controller in communication with the image capture unit, the filter switch and the IR LED, the controller configured to provide the IR filter command and the IR LED command in response to a limited-use night vision condition based upon a factor other than an amount of atmospheric light, wherein in the limited-use night vision condition the IR LED command illuminates the field of view.

2. The system of claim 1, wherein the field of view corresponds to a rear-facing field view, and the IR LED is configured to illuminate alongside a vehicle trailer.

3. The system of claim 2, wherein the display is configured to display Class II and Class IV views.

4. The system of claim 1, wherein the factor is a predetermined speed threshold.

5. The system of claim 1, wherein the factor is a gear position.

6. The system of claim 1, wherein the image capture unit includes an RCCB filter, and a green light is determined by subtracting a red light and a blue light from a clear filter portion.

7. The system of claim 1, wherein the controller provides the IR LED command and the IR filter command simultaneously.

8. The system of claim 7, wherein the controller turns off the IR LED and removes the IR filter from the optical path simultaneously after a predetermined time.

9. A camera mirror system for a vehicle comprising:
   a camera having a field of view, the camera including a lens configured to focus light on an image capture unit and a filter switch each arranged in an optical path provided between the lens and the image capture unit, the filter switch having an infrared (IR) filter movable into and out of the optical path in response to a IR filter command;
   a display in communication with the camera and configured to display the field of view;
   an IR light-emitting diode (LED) configured to illuminate the field of view in response to an IR LED command; and
   a controller in communication with the image capture unit, the filter switch and the IR LED, the controller configured to provide the IR filter command and the IR LED command in response to a limited-use night vision condition based upon a factor other than an amount of atmospheric light, wherein the factor is a transitory lighting condition, wherein the transitory light condition is a low light condition on one side of the vehicle compared to an opposite side of the vehicle.

10. A method of managing night vision for a vehicle camera mirror system, comprising the steps of:
    filtering light from a field of view of a camera lens to an image capture unit;
    detecting a limited-use night vision condition based upon a factor other than an amount of atmospheric light;
    powering an infrared light-emitting diode (IR LED) to shine IR light in the field of view in response to the detecting step;
    actuating an IR filter to filter IR light from the lens to the image capture unit in response to the detecting step; and
    displaying a night vision image from the image capture unit.

11. The method of claim 10, wherein the powering step includes illuminating alongside a vehicle trailer.

12. The method of claim 11, wherein the displaying step includes displaying Class Il and Class IV views illuminated by the IR LED.

13. The method of claim 10, wherein the factor is a predetermined speed threshold.

14. The method of claim 10, wherein the factor is a gear position.

15. The method of claim 10, wherein the filtering step includes using an RCCB filter arranged in a Bayer filter pattern, and a green light is determined by subtracting a red light and a blue light from a clear filter portion.

16. The method of claim 10, wherein the powering and actuating steps are performed simultaneously.

17. The method of claim 16, comprising a step of removing the IR filter from an optical path of the image capture unit simultaneously with powering off the IR LED after a predetermined time.

18. A method of managing night vision for a vehicle camera mirror system, comprising the steps of:
    filtering light from a field of view of a camera lens to an image capture unit;
    detecting a limited-use night vision condition based upon a factor other than an amount of atmospheric light;
    powering an infrared light-emitting diode (IR LED) to shine IR light in the field of view in response to the detecting step;
    actuating an IR filter to filter IR light from the lens to the image capture unit in response to the detecting step; and
    displaying a night vision image from the image capture unit, wherein the factor is a transitory lighting condition, wherein the transitory light condition is a low light condition on one side of the vehicle compared to an opposite side of the vehicle.

* * * * *